(12) United States Patent
Tavernier

(10) Patent No.: US 6,824,886 B2
(45) Date of Patent: Nov. 30, 2004

(54) MEDIUM DENSITY POLYETHYLENE COMPOSITIONS FOR FILM APPLICATIONS

(75) Inventor: Marc Tavernier, Vilvoorde (BE)

(73) Assignee: ATOFINA Research S.A., Feluy (BE)

( * ) Notice: Subject to any disclaimer, the term of this patent is extended or adjusted under 35 U.S.C. 154(b) by 0 days.

(21) Appl. No.: 10/149,576

(22) PCT Filed: Dec. 12, 2000

(86) PCT No.: PCT/EP00/12549
§ 371 (c)(1),
(2), (4) Date: Sep. 23, 2002

(87) PCT Pub. No.: WO01/44365
PCT Pub. Date: Jun. 21, 2001

(65) Prior Publication Data
US 2003/0091849 A1 May 15, 2003

(30) Foreign Application Priority Data
Dec. 13, 1999 (EP) .............................. 99124749

(51) Int. Cl.⁷ .............................. B32B 27/32
(52) U.S. Cl. .................. 428/516; 428/213; 264/173.16
(58) Field of Search .............................. 428/213, 516; 525/240; 264/173.16

(56) References Cited

U.S. PATENT DOCUMENTS

| | | | | |
|---|---|---|---|---|
| 5,747,594 A | * | 5/1998 | deGroot et al. | 525/240 |
| 6,114,456 A | * | 9/2000 | Dewart et al. | 525/240 |
| 6,187,397 B1 | * | 2/2001 | Grangette | 428/34.9 |
| 6,423,421 B1 | * | 7/2002 | Banaszak et al. | 428/516 |
| 6,437,064 B1 | * | 8/2002 | Eckstein et al. | 526/160 |
| 6,482,532 B1 | * | 11/2002 | Yap et al. | 428/516 |

OTHER PUBLICATIONS

"Alloys of Medium and Low Density Polyethylene," Research Disclosure, GB, Industrial Opportunities Ltd. Havant, No. 363, Jul. 1, 1994, p. 349, XP000461299 (ISSN 0374–4353).

"Advantages of Metallocene Ethylene Polymer Resins in Multilayer Blown and Cast Stretch Films," Research Disclosure, GB, Industrial Opportunities Ltd. Havant, No. 412, August.

* cited by examiner

Primary Examiner—D. Lawrence Tarazano
(74) Attorney, Agent, or Firm—William D. Jackson

(57) ABSTRACT

Use of a homogeneous blend of a metallocene-catalysed medium density polyethylene (mMDPE) with low density polyethylene (LDPE), to produce blown films, this composition essentially consisting of from 0.5 to 99.5 % by weight of mMDPE and from 99.5 to 0.5 % by weight of LDPE, based on the total weight of the blend. The blend is optionally coextruded between layers of LDPE. The compositions of this invention have good processability and are used to make blown films which have the good optical properties of LDPE and the good mechancial and processing properties of MDPE.

14 Claims, No Drawings

MEDIUM DENSITY POLYETHYLENE COMPOSITIONS FOR FILM APPLICATIONS

The present invention relates to polyethylene compositions and films thereof combining excellent optical and mechanical properties with good processability and down-gauging possibilities while assuring an excellent stiffness and shrinkage. This polyethylene composition can therefore be used for film applications, requiring this unique combination of properties, such as but not exclusively, food or non-food packaging, personal care products, agricultural or industrial products.

Low density polyethylene (LDPE) offers excellent optical properties and can be processed at low temperatures and pressures while maintaining a good melt strength. LDPE has however limited possibilities for down-gauging, due to a low draw ratio, and a low stiffness.

Linear-low-density polyethylene (LLDPE) has greatly improved down-gauging possibilities and excellent tear and impact properties; its stiffness however remains low and its processability is well below that of LDPE. Also, conventional LLDPE's optical properties do not match those of LDPE. Optical properties of LLDPE have been improved by using metallocene-catalysed LLDPE (mLLDPE) resins; stiffness is however not improved in these products and the processability of these grades is generally worse than that of conventional LLDPE.

Wherever high rigidity is needed, LDPE and LLDPE compositions will require overly thick structures. Especially for LLDPE, where excellent impact and tear properties render its down-gauging capability useful, the lack of rigidity is a main drawback because high rigidity is a requirement for product handling.

Conventional medium density polyethylene (MDPE) offers an improved rigidity, excellent processability and down-gauging possibilities. MDPE however lacks the good optical properties of LDPE or LLDPE.

Blends of conventional MDPE with LDPE and/or LLDPE can be used for improving rigidity and/or down-gauging and/or processability of LDPE and/or LLDPE but do not provide their good optical properties. WO 95/27005 discloses mixtures of LDPE with LLDPE or mLLDPE. The stiffness of their resins is insufficient.

Therefore, there exists a need for a polyethylene composition that will match the transparency and gloss offered by LDPE and the stiffness of MDPE while maintaining the same impact, tear, down-gauging and processing properties as MDPE.

It is therefore an object of the present invention to provide polyethylene compositions for films, prepared with one or more layers, that achieve a better balance between the good optical qualities of LDPE and the rigidity, down-gauging, processability, impact and tear properties of MDPE.

It is another object of the present invention to provide polyethylene compositions that can be used to prepare films with improved shrink properties.

In the present invention, a film is defined as an extremely thin continuous sheet: the upper limit for thickness is of about 250 microns (Hawley's Condensed Chemical Dictionary, Twelfth Edition, Rev. by R. J. Lewis, Van Nostrand Reinhold Co., New York)

DESCRIPTION OF THE INVENTION

This invention concerns films prepared from a homogeneous blend of a low density polyethylene (LDPE) with a metallocene-catalysed medium density polyethylene (mMDPE), said blend consisting essentially of from 0.5 to 99.5% by weight of mMDPE and from 99.5 to 0.5% by weight of LDPE, based on the total weight of the blend, and said blend being optionally coextruded between two layers of a blend consisting of LDPE and/or LLDPE that may be the same or different, and the metallocene catalyst system comprising a bridged metallocene compound, alone or in combination with another metallocene catalyst which contributes less than 80% by weight of said catalyst combination.

They have good processability and down-gauging capabilities and are used to make films that have optical properties comparable to those of LDPE with mechanical properties at least comparable to those of chromium-catalysed MDPE.

This result was unexpected as it is commonly accepted that the use of metallocene catalysts becomes less advantageous over the use of conventional catalysts as the density increases; the improvements observed in low and very low density resins, such as improved impact and optical properties, are thus not expected in higher density resins.

The manufacture of the low density and linear low density polyethylenes used in the present invention is known in the art and is described for example in "Encyclopedia of Polymer Science and Engineering", second edition, Volume 6, on pages 404 to 410 (LDPE) and pages 436 to 444 (LLDPE). Metallocene catalysts have not been employed to prepare the LDPE used in the blends of the present invention.

The catalyst system used in the present invention to manufacture medium density polyethylene comprises necessarily a bridged metallocene compound such as described in EP-A-0790259, preferably a bis tetrahydro-indenyl compound of the general formula $(IndH_4)_2R''MQ_2$ in which each Ind is the same or different and is indenyl or substituted indenyl, R" is a bridge which comprises a $C_1$–$C_4$ alkylene radical, a dialkyl germanium or silicon or siloxane, or an alkyl phosphine or amine radical, which bridge is substituted or unsubstitued, M is a Group IV metal or vanadium and each Q is hydrocarbyl having 1 to 20 carbon atoms or halogen.

Each bis tetrahydro-indenyl compound may be substituted in the same way or differently from one another at one or more positions in the cyclopentadienyl ring, the cyclohexenyl ring and the ethylene bridge.

Each substituent group may be independently chosen from those of formula $XR_v$ in which X is chosen from group IVA, oxygen and nitrogen and each R is the same or different and chosen from hydrogen or hydrocarbyl of from 1 to 20 carbon atoms and v+1 is the valence of X. X is preferably C. If the cyclopentadienyl ring is substituted, its substituent groups must not be so bulky as to affect coordination of the olefin monomer to the metal M. Substituents on the cyclopentadienyl ring preferably have R as hydrogen or $CH_3$. More preferably, at least one and most preferably both cyclopentadienyl rings are unsubstituted.

In a particularly preferred embodiment, both indenyls are unsubstituted.

R" is preferably a $C_1$–$C_4$ alkylene radical (as used herein to describe a difunctional radical, also called alkylidene), most preferably an ethylene bridge (as used herein to describe a difunctional radical, also called ethylidene), which is substituted or unsubstituted.

The metal M is preferably zirconium, hafnium or titanium, most preferably zirconium. Each Q is the same or different and may be a hydrocarbyl or hydrocarboxy radical having 1–20 carbon atoms or a halogen. Suitable hydrocarbyls include aryl, alkyl, alkenyl, alkylaryl or aryl alkyl. Each Q is preferably halogen.

Ethylene bis (4,5,6,7-tetrahydro-1-indenyl) zirconium dichloride is a particularly preferred bis tetrahydro-indenyl compound of the present invention.

The metallocene catalyst component used in the present invention can be prepared by any known method. A preferred preparation method is described in J. Org. Chem. 288, 63–67 (1985).

Any metallocene catalyst known in the art as suitable for the polymerization of olefins can be used in combination with the bis tetrahydro-indenyl compound, in an amount not to exceed 80% by weight of said combination.

These are described for example in EP Application n° 96200422.9.

They can be represented by the general formulae:

$$(Cp)_m MR_n X_q \qquad \text{I.}$$

wherein Cp is a cyclopentadienyl ring, M is a Group 4b, 5b or 6b transition metal, R is a hydrocarbyl group or hydrocarboxy having from 1 to 20 carbon atoms, X is a halogen, and m=1–3, n=0–3, q=0–3 and the sum of m+n+q will be equal to the oxidation state of the metal.

$$(C_5 R'_k)_g R''_s (C_5 R'_k) MQ_{3-g} \text{ and} \qquad \text{II.}$$

$$R''_s (C_5 R'_k)_2 MQ' \qquad \text{III.}$$

wherein $(C_5 R'_k)$ is a cyclopentadienyl or substituted cyclopentadienyl, each R' is the same or different and is hydrogen or a hydrocarbyl radical such as alkyl, alkenyl, aryl, alkylaryl, or arylalkyl radical containing from 1 to 20 carbon atoms or two carbon atoms are joined together to form a $C_4$–$C_6$ ring, R'' is a $C_1$–$C_4$ alkylene radical, a dialkyl germanium or silicon or siloxane, or a alkyl phosphine or amine radical bridging two $(C_5 R'_k)$ rings, Q is a hydrocarbyl radical such as aryl, alkyl, alkenyl, alkylaryl, or aryl alkyl radical having from 1–20 carbon atoms, hydrocarboxy radical having 1–20 carbon atoms or halogen and can be the same or different from each other, Q' is an alkylidene radical having from 0 to about 20 carbon atoms, s is 0 or 1, g is 0,1 or 2, s is 0 when g is 0, k is 4 when s is 1 and k is 5 when s is 0, and M is as defined above.

Exemplary hydrocarbyl radicals are methyl, ethyl, propyl, butyl, amyl, isoamyl, hexyl, isobutyl, heptyl, octyl, nonyl, decyl, cetyl, 2-ethylhexyl, phenyl and the like. Exemplary halogen atoms include chlorine, bromine, fluorine and iodine and of these halogen atoms, chlorine is preferred.

Exemplary hydrocarboxy radicals are methoxy, ethoxy, propoxy, butoxy, amyloxy and the like.

Exemplary of the alkylidene radicals are methylidene, ethylidene and propylidene, and i-butylidene.

The metallocenes may be supported. In the event it is supported, the support used in the present invention can be any organic or inorganic solids, particularly porous supports such as talc, inorganic oxides, and resinous support material such as polyolefin. Preferably, the support material is an inorganic oxide in its finely divided form.

Suitable inorganic oxide materials which are desirably employed in accordance with this invention include Group 2a, 3a, 4a or 4b metal oxides such as silica, alumina and mixtures thereof. Other inorganic oxides that may be employed either alone or in combination with the silica, or alumina are magnesia, titania, zirconia, and the like. Other suitable support materials, however, can be employed, for example, finely divided functionalized polyolefins such as finely divided polyethylene. Preferably, the support is a silica having a surface area comprised between 200 and 600 $m^2/g$ and a pore volume comprised between 0.5 and 3 ml/g.

An active site must be created by adding a cocatalyst having an ionizing action. While alumoxane can be used as cocatalyst, it is not necessary to use alumoxane as cocatalyst during the polymerization procedure for preparing medium density polyethylene according to the process of the present invention.

When alumoxane is used as a cocatalyst, any alumoxane known in the art can be used in the present invention.

The preferred alumoxanes comprise oligomeric linear and/or cyclic alkyl alumoxanes represented by the formulae:

$$R\text{---}(Al\text{---}O)_n\text{---}AlR_2 \qquad \text{(IV)}$$
$$\phantom{R\text{---}(}R$$

for oligomeric, linear alumoxanes and $$(\text{---}Al\text{---}O)_m \qquad \text{(V)}$$
$$\phantom{(\text{---}}R$$

for oligomeric, cyclic alumoxanes,
wherein n is 1–40, preferably 10–20, m is 3–40, preferably 3–20 and R is a $C_1$–$C_8$ group and preferably methyl.

Generally, in the preparation of alumoxanes from, for example, trimethyl aluminum and water, a mixture of linear and cyclic compounds is obtained.

Methylalumoxane is preferably used.

The alumoxane is usually delivered as a concentrated solution of alumoxane in toluene.

When alumoxane is not used as a cocatalyst, according to a preferred embodiment of the present invention, one or more aluminiumalkyl represented by the formula $AlR_x$ are used wherein each R is the same or different and is selected from halides or from alkoxy or alkyl groups having from 1 to 12 carbon atoms and x is from 1 to 3. Especially suitable aluminiumalkyl are trialkylaluminium selected from trimethylaluminium, triethylaluminium, triisobutylaluminium, tri-n-octylaluminium or tri-n-hexylaluminium, the most preferred being triisobutylaluminium (TIBAL).

The amount of alumoxane or aluminiumalkyl and metallocene usefully employed in the preparation of the solid support catalyst can vary over a wide range. Preferably, the aluminium to transition metal mole ratio is comprised between 1:1 and 100:1, preferably between 5:1 and 50:1.

The metallocene catalyst utilized to produce the medium density polyethylene required by the present invention can be used in gas, solution or slurry polymerizations. Preferably, in the present invention, the polymerization process is conducted under slurry phase polymerization conditions. It is preferred that the slurry phase polymerization conditions comprise a temperature of from 20 to 125° C., preferably from 60 to 95° C. and a pressure of from 0.1 to 5.6 MPa, preferably from 2 to 4 MPa for a time between 10 minutes and 4 hours, preferably between 1 and 2.5 hours.

It is preferred that the polymerization reaction be run in a diluent at a temperature at which the polymer remains as a suspended solid in the diluent. Diluents include, for examples, isobutane, n-hexane, n-heptane, methylcyclohexane, n-pentane, n-butane, n-decane, cyclohexane and the like. The preferred diluent is isobutane.

According to a preferred embodiment of the present invention, a continuous reactor is used for conducting the polymerization. This continuous reactor is preferably a loop reactor. During the polymerization process, at least one monomer, the catalytic system and a diluent are flowed in admixture through the reactor.

In the present invention average molecular weights can be further controlled by the introduction of some amount of hydrogen or by changing the temperature during polymerization. When hydrogen is used it is preferred that the relative amounts of hydrogen and olefin introduced into the polymerization reactor be within the range of about 0.001 to 15 mole percent hydrogen and 99.999 to 85 mole percent olefin based on total hydrogen and olefin present, preferably about 0.2 to 3 mole percent hydrogen and 99.8 to 97 mole percent olefin.

The densities of the metallocene catalyzed polyethylenes (mMDPE) used in the present invention are regulated by the amount of comonomer injected in the reactor; they will range from 0.925 g/cm$^3$ to 0.955 g/cm$^3$ and preferably from 0.930 g/cm$^3$ to 0.945 g/cm$^3$. Examples of comonomer which can be used include 1-olefins butene, hexene, octene, 4-methyl-pentene, and the like, the most preferred being hexene.

The melt indices of the metallocene catalyzed polyethylene (mMDPE) used in the present invention can be regulated by the amount of hydrogen injected in the reactor; they will range from 0.05 g/10' to 5 g/10', preferably from 0.1 g/10' to 4 g/10'.

Research has been conducted on metallocene catalysts leading to a very wide range of polyethylene products with both narrow and broad molecular weight distribution (MWD).

In changing the MWD, resins are obtained with largely different viscous behavior. The shear response sensitivity is commonly expressed by the ratio (SR2) of melt flows (ASTM D-1238-89A at 190° C.) with loads of 21.6 kg (HLMI) and 2.16 kg (MI2). Resins with a narrow MWD have typical SR2 values of about 15. The resins of the present invention have values going from the typical low values of about 15 for narrow MWD resins to values ranging from 15 to 70 depending on the bridged metallocene catalyst used for polymerisation, the production conditions and the MI2-value of the resulting resin.

Standard additives may be used for both long term and processing stabilization and if desired, one or more pigments and/or dyes can also be added.

The applicants have found that the selection of catalyst composition and production conditions allows independent determination of MI2, density and SR2 values. For conventional catalytic systems, the values of SR2 are, within rather narrow limits, defined by the choice of MI2.

The mMDPE catalysed by the procedure described hereabove are used in blends with LDPE in various ratios.

According to embodiments of the present invention, compositions of LDPE with mMDPE are obtained either by preliminary dry blend or extrusion or by direct blend in the hopper or via the extruder.

Materials are run under production conditions for existing commercial applications where processability, downgauging and good optics are key issues. Excellent outputs are achieved.

Generally, the blends of the present invention comprise from about 0.5 to 99.5% by weight of mMDPE and from 99.5 to 0.5% by weight of LDPE, based on the total weight of the blend. Preferably the composition of the present invention comprises from 2.5 to 70% by weight of mMDPE and from 30 to 97.5% by weight of LDPE, based on the total weight of the blend. The resulting polyethylene has a density of from 0.930 to 0.955 g/cm$^3$ and a melt index MI2 of from 0.2 to 10 g/10 min.

In this specification, the density of the polyethylene is measured at 23° C. using procedures of ASTM D 1505.

The film is produced by coextruding the mMDPE/LDPE blend described hereabove between two layers, each layer being a blend comprising LDPE and/or LLDPE. The LDPE is prepared with a non-metallocene catalyst and the LLDPE is prepared either with a Ziegler-Natta catalyst or with a metallocene catalyst. The two external layers may be the same or different and each layer is from 0 to 33 wt % and preferably from 5 to 30 wt % of the total weight of the film.

Excellent transparency and gloss are obtained for all the compositions tested in the above mentioned ranges.

It is also observed that the mechanical properties of the films prepared with the compositions and process of the present invention are excellent, particularly the rigidity and the shrink properties.

The blown film is produced by the steps of:

a) preparing a blend of 0.5 to 99.5% by weight of a metallocene-catalysed medium density polyethylene (mMDPE) with 99.5 to 0.5% by weight of a low density polyethylene prepared with a non-metallocene catalyst (LDPE), based on the total weight of the blend, said blend having a density of from 0.93 to 0.955 g/cm$^3$ and a melt index MI2 of from 0.2 to 10 g/10 min, and the metallocene catalyst system essentially consisting of a bridged metallocene compound, alone or in combination with another metallocene catalyst which contributes;

b) preparing a second composition of a LDPE prepared with a non-metallocene catalyst, and/or a LLDPE prepared with either a non-metallocene or a metallocene catalyst;

c) preparing a third composition of a LDPE prepared with a non-metallocene catalyst, and/or a LLDPE prepared with either a non-metallocene or a metallocene catalyst, said composition being the same or different from the composition of step b);

d) coextruding the blend of step a) between a layer prepared from the composition of step b) and a layer prepared from the composition of step c), said blend of step a) representing from 33 to 100% by weight of the total weight of the film;

e) blowing the coextrudate of step d) to prepare a blown film with improved optical properties.

The films prepared according to this invention have thus improved clarity and gloss, excellent and balanced tear properties, high impact resistance while maintaining standard down-gauging possibilities, stiffness, shrinkage and good processability.

EXAMPLES

1. Polymerization Procedure and Product Composition

The polymerization of metallocene-catalysed medium density polyethylene of the present invention was carried out in a liquid-full slurry loop reactor. Ethylene was injected with 1-hexene together with the catalyst. Isobutane was used as diluent. The polymerization conditions are indicated in Table I

TABLE I

|  |  | Resin R1 |
|---|---|---|
| C2 feed | (kg/h) | 1600 |
| C6 feed | (g/kg C2) | 43 |
| H2 feed | (mg/h) | 10000 |

TABLE I-continued

|  |  |  | Resin R1 |
|---|---|---|---|
| Iso C4 feed | (kg/h) |  | 1950 |
| Tibal conc | (ppm) |  | 500 |
| Tpol | (° C.) |  | 86 |

C2 = ethylene
C6 = 1-hexene
iso C4 = isobutane
TIBAL = triisobutylaluminium

The bridged metallocene catalyst was ethylene bis (tetrahydro-indenyl) zirconium dichloride.

For comparison, a MDPE resin R2 of the same density as resin R1 was prepared with a chromium catalyst.

The data concerning resins R1 and R2 are summarised in Table II.

TABLE II

|  | R1 | R2 |
|---|---|---|
| Density g/cm³ | 0.934 | 0.934 |
| MI2 g/10 min | 0.9 | 0.15 |
| HLMI g/10 min | 25 | 14.5 |
| SR2 = HLMI/MI2 | 28 | 100 |

The resins R1 and R2 were then blended with a LDPE in the proportions of 70% by weight of resin R1 or resin R2 and 30% by weight of LDPE in order to produce respectively the blends B1 and B2. The MI2 of the LDPE was 0.7 g/10 min.

2. Film Preparation.

Several films have been prepared.

Film F1, used for comparison was prepared with a conventional LDPE.

Film F2 was prepared with the blend B2 alone.

Film F3 was prepared with the blend B1 alone.

Films F1, F2 and F3 were blown using a low density configuration characterised by a die of 180 mm, a BUR of 2.7, no neck and a die gap of 1.2 mm. The films were down-gauge to a thickness of 40 microns.

Films F4 and F5 included, before blowing, the additional step of coextruding the blend B1 or the blend B2 between two layers of identical LDPE in the amounts of 10% by weight for each external LDPE layer and 80% by weight for the middle layer of the blend B1 or B2, based on the total weight of the film.

Film F4 was prepared from blend B2 coextruded With LDPE.

Film F5 was prepared from blend B1 coextruded with LDPE.

Films F4 and F5 were blown using a low density configuration characterised by a die of 350 mm, a BUR of 2.2, no neck and a die gap of 1.4 mm. The films were down-gauge to a thickness of 40 microns.

3. Film Properties

Optical properties (haze and gloss), rigidity and shrinkage of the five films F1 to F5 are given in Table III. It is seen that the films of the present invention have improved optical properties that at least equate and can even surpass, in the cade of coextrusion those of the films prepared with conventional LDPE. In addition, their rigidity is excellent and compares favorably with that of films prepared with MDPE.

TABLE III

|  | F1 | F2 | F3 | F4 | F5 |
|---|---|---|---|---|---|
| Haze % | 8 | 23 | 11 | 12 | 8 |
| Gloss % | 65 | 35 | 55 | 60 | 75 |
| Stress at yield (Mpa) | 13.5 | 18.5 | 18 |  |  |
| Shrinkage % | 71 | 71 | 73 | 71 | 73 |

The gloss was measured at an angle of 450 with the Byk-Gardner micro-gloss reflectometer; the haze was measured with the Byk-Gardner Hazegard® system. The stress at yield was measured by ASTM D 882 method.

What is claimed is:

1. A coextruded film consisting of:
   (i) a first layer of a composition comprising a low density polyethylene (LDPE) prepared with a non-metallocene catalyst and/or a linear low density polyethylene (LLDPE) prepared with either a non-metallocene or a metallocene catalyst;
   (ii) a second layer of a homogeneous blend of a low density polyethylene (LDPE) with a metallocene catalyzed medium density polyethylene (mMDPE), this blend essentially consisting of from 0.5 to 99.5% by weight of mMDPE and from 99.5 to 0.5% by weight of LDPE, based on the total weight of the blend, and having a density of from 0.925 to 0.955 g/cm³, and the metallocene catalyst system essentially consisting of a bridged metallocene compound, alone or in combination with another metallocene catalyst which contributes less than 80% by weight of said metallocene;
   (iii) a third layer of a composition comprising a low density polyethylene (LDPE) prepared with a non-metallocene catalyst and/or a linear low density polyethylene (LLDPE) prepared either with a non-metallocene or a metallocene catalyst, said third layer being the same as or different from the first layer.

2. The coextruded film of claim 1, wherein the bridged metallocene catalyst is a bis tetrahydro-indenyl compound.

3. The coextruded film of claim 1, wherein the bridged metallocene is a ethylene bis tetrahydro-indenyl zirconium compound.

4. The coextruded film of claim 1, wherein the first and third layers are external layers and the two external layers have the same composition.

5. The coextruded film of claim 1, wherein the first and third layers are external layers and each of the two external layers represent from 5 to 33 wt % of the total weight of the film.

6. The coextruded film of claim 4, wherein the two external layers have the same thickness.

7. A process for preparing a blow film:
   a) preparing a blend of 0.5 to 99.5% by weight of a metallocene-catalyzed medium density polyethylene (mMDPE) with 99.5 to 0.5% by weight of a low density polyethylene prepared with a non-metallocene catalyst (LDPE), based on the total weight of the blend, said blend having a density of from 0.93 to 0.955 g/cm³ and a melt index MI2 of from 0.2 to 10 g/10 min, and the metallocene catalyst system essentially consisting of a bridged metallocene compound, alone or in combination with another metallocene catalyst which contributes less than 80% by weight of said metallocene;
   b) preparing a second composition of a LDPE prepared with a non-metallocene catalyst, and/or a LLDPE prepared with either a non-metallocene or a metallocene catalyst;

c) preparing a third composition of a LDPE prepared with a non-metallocene catalyst, and/or a LLDPE prepared with either a non-metallocene or a metallocene catalyst, said composition being the same or different from the composition of step b);

d) coextruding the blend of step a) between a layer prepared from the composition of step b) and a layer prepared from the composition of step c), said blend of step a) representing from 33 to 100% by weight of the total weight of the film;

e) blowing the coextrudate of step d) to prepare a blown film with improved optical properties.

8. The process of claim 7, wherein the metallocene catalyst is a bis tetrahydro-indenyl compound.

9. The process of claim 7, wherein the two external layers of the coextrudate have the same composition.

10. The process of claim 9, wherein the two external layers have the same thickness.

11. The coextruded film of claim 4 wherein each of the two external layers represent from 5 to 33 wt % of the total weight of the film.

12. The coextruded film of claim 11, wherein the two external layers have the same thickness.

13. The coextruded film of claim 1 wherein said metallocene-catalyzed medium density polyethylene has a density within the range of 0.93 to 0.945 g/cm$^3$.

14. The process of claim 7 wherein said metallocene-catalyzed medium density polyethylene has a density within the range of 0.93 to 0.945 g/cm$^3$.

* * * * *

UNITED STATES PATENT AND TRADEMARK OFFICE
CERTIFICATE OF CORRECTION

PATENT NO.   : 6,824,886 B2
DATED        : November 30, 2004
INVENTOR(S)  : Marc Tavernier It is certified that error appears in the above-identified patent and that said Letters Patent is hereby corrected as shown below:

<u>Column 8,</u>
Line 11, replace "450" with -- 45º --.
Line 52, replace "blow" with -- blown --.

Signed and Sealed this

Tenth Day of January, 2006

JON W. DUDAS
*Director of the United States Patent and Trademark Office*